US010009050B2

(12) United States Patent
Chen et al.

(10) Patent No.: US 10,009,050 B2
(45) Date of Patent: Jun. 26, 2018

(54) QUADRATURE TRANSMITTER, WIRELESS COMMUNICATION UNIT, AND METHOD FOR SPUR SUPPRESSION

(71) Applicant: MEDIATEK Singapore Pte. Ltd, Singapore (SG)

(72) Inventors: Yangjian Chen, Kent (GB); Bernard Mark Tenbroek, Kent (GB); Chien-Wei Tseng, Keelung (TW); Ian Tseng, Taipei (TW); Ming-Da Tsai, Miaoli County (TW); Chien-Cheng Lin, Taichung (TW)

(73) Assignee: MediaTek Singapore Pte. Ltd., Solaris (SG)

( * ) Notice: Subject to any disclaimer, the term of this patent is extended or adjusted under 35 U.S.C. 154(b) by 0 days. days.

(21) Appl. No.: 15/367,439

(22) Filed: Dec. 2, 2016

(65) Prior Publication Data
US 2017/0346510 A1 Nov. 30, 2017

Related U.S. Application Data

(60) Provisional application No. 62/342,148, filed on May 26, 2016.

(51) Int. Cl.
*H04L 25/00* (2006.01)
*H04B 1/04* (2006.01)
*H04L 25/49* (2006.01)

(52) U.S. Cl.
CPC .......... *H04B 1/0475* (2013.01); *H04L 25/49* (2013.01)

(58) Field of Classification Search
None
See application file for complete search history.

(56) References Cited

U.S. PATENT DOCUMENTS 4,457,022 A * 6/1984 Dydyk ................. H03D 7/165
455/302
5,214,796 A * 5/1993 Gorrie ................. H03D 7/1408
455/302

(Continued)

FOREIGN PATENT DOCUMENTS

EP 1424769 A1 * 6/2004 ............. H03D 7/165
EP 2360835 A1 8/2011

(Continued)

OTHER PUBLICATIONS

Y.-H. Chen, et al., "An LTE SAW-Less Transmitter Using 33% Duty-Cycle LO Signals for Harmonic Suppression," IEEE Int. Solid-State Circuits Conf., Feb. 2015.

(Continued)

*Primary Examiner* — Chieh M Fan
*Assistant Examiner* — Berhanu Tadese
(74) *Attorney, Agent, or Firm* — Optimus Patents US, LLC

(57) ABSTRACT

A quadrature transmitter is described that comprises: a first transmitter path and a second transmitter path that are matched. Each transmitter path comprises: at least one input arranged to receive respective first or second sets of quadrature baseband signals; at least one local oscillator, LO, port configured to receive respective first and second sets of quadrature LO signals; at least one mixer stage coupled to the at least one input and configured to respectively multiply the sets of quadrature baseband signals with the respective first or second sets of quadrature LO signals to produce a respective output radio frequency, RF, signal; and a combiner configured to combine the output radio frequency signals of the first transmitter path and the second transmitter path. The first set of quadrature signals is a substantially 45° phase shifted version of the second set of quadrature signals; and the first set of quadrature LO signals is a reverse (Continued)

substantially 45° phase shifted version of the second set of quadrature LO signals.

21 Claims, 8 Drawing Sheets

(56) References Cited

U.S. PATENT DOCUMENTS

| | | | | |
|---|---|---|---|---|
| 6,560,297 | B1* | 5/2003 | Broughton | H03D 7/165 375/295 |
| 6,631,256 | B2* | 10/2003 | Suominen | H03D 3/007 455/302 |
| 6,766,158 | B1* | 7/2004 | Molnar | H03D 7/163 331/46 |
| 7,130,604 | B1* | 10/2006 | Wong | H03D 7/12 455/302 |
| 7,299,025 | B1* | 11/2007 | Wong | H03D 7/14 455/130 |
| 8,114,600 | B2* | 2/2012 | Brennan | C12Q 1/6883 435/6.11 |
| 8,260,223 | B2* | 9/2012 | He | H03D 7/1441 455/120 |
| 8,660,508 | B2* | 2/2014 | Jeurissen | H03D 7/1441 455/226.1 |
| 8,670,739 | B1* | 3/2014 | Murphy | H04B 1/1027 375/350 |
| 9,071,197 | B2 | 6/2015 | Vora et al. | |
| 9,628,308 | B2* | 4/2017 | Muhammad | H03L 7/1976 |
| 9,692,464 | B1* | 6/2017 | Cheng | H04B 1/0475 |
| 2002/0055337 | A1* | 5/2002 | Persico | H03D 7/165 455/112 |
| 2004/0106380 | A1* | 6/2004 | Vassiliou | H04B 17/14 455/73 |
| 2006/0205370 | A1* | 9/2006 | Hayashi | H03D 7/1441 455/209 |
| 2008/0113628 | A1* | 5/2008 | Muhammad | H04B 1/52 455/77 |
| 2009/0315611 | A1* | 12/2009 | Lu | H03D 7/1441 327/361 |
| 2009/0325510 | A1* | 12/2009 | Pullela | H03D 7/1441 455/76 |
| 2010/0156502 | A1 | 6/2010 | Van Zeiji et al. | |
| 2011/0136460 | A1 | 6/2011 | Cho et al. | |
| 2011/0217940 | A1* | 9/2011 | Oliaei | H03F 3/16 455/127.2 |
| 2011/0279164 | A1* | 11/2011 | Shimizu | H03D 7/1441 327/355 |
| 2012/0064850 | A1 | 3/2012 | Matsui | |
| 2012/0263215 | A1* | 10/2012 | Peng | H04B 1/0475 375/221 |
| 2012/0328041 | A1* | 12/2012 | Chen | H04L 27/364 375/285 |
| 2013/0003890 | A1* | 1/2013 | Schwent | H04L 27/2657 375/296 |
| 2013/0059556 | A1* | 3/2013 | Molnar | H03G 3/3052 455/234.1 |
| 2013/0115907 | A1* | 5/2013 | Theodoratos | H03D 7/1441 455/326 |
| 2013/0169342 | A1* | 7/2013 | Cho | H03D 7/00 327/358 |
| 2013/0257508 | A1* | 10/2013 | Goel | H03B 1/04 327/357 |
| 2014/0018014 | A1* | 1/2014 | Modha | H04B 1/48 455/78 |
| 2014/0018123 | A1* | 1/2014 | Frank | H04W 52/367 455/522 |
| 2014/0155013 | A1* | 6/2014 | Murphy | H03F 1/0277 455/256 |
| 2014/0169237 | A1* | 6/2014 | Furuta | H04B 1/0475 370/278 |
| 2014/0176217 | A1 | 6/2014 | Lin et al. | |
| 2014/0364076 | A1* | 12/2014 | Cha | H04B 1/10 455/295 |
| 2015/0030105 | A1* | 1/2015 | Vora | H03D 7/165 375/297 |
| 2015/0094004 | A1* | 4/2015 | Vora | H03D 7/166 455/114.1 |
| 2016/0127160 | A1* | 5/2016 | Muhammad | H03L 7/1976 375/260 |
| 2016/0164464 | A1 | 6/2016 | Sun | |
| 2017/0141737 | A1* | 5/2017 | Seth | H03F 1/0233 |
| 2017/0180181 | A1* | 6/2017 | Chen | H04L 27/368 |

FOREIGN PATENT DOCUMENTS

| | | | | |
|---|---|---|---|---|
| JP | | 2003198329 A | * 7/2003 | ............ H03D 7/165 |
| WO | WO 2015135507 A1 | * 9/2015 | ........... H03D 7/1441 |

OTHER PUBLICATIONS

J. Weldon et al., "A 1.75-GHz Highly Integrated Narrow-Band CMOS Transmitter with Harmonic-Rejection Mixers", IEEE J. Solid State Circuits, vol. 36, pp. 2003-2015, Dec. 2001.

M. Ingels, et al., "A Multiband 40nm CMOS LTE SAW-Less Modulator with −60dBc C-IM3," ISSCC Digest Tech. Papers, pp. 338-339, Feb. 2013.

* cited by examiner

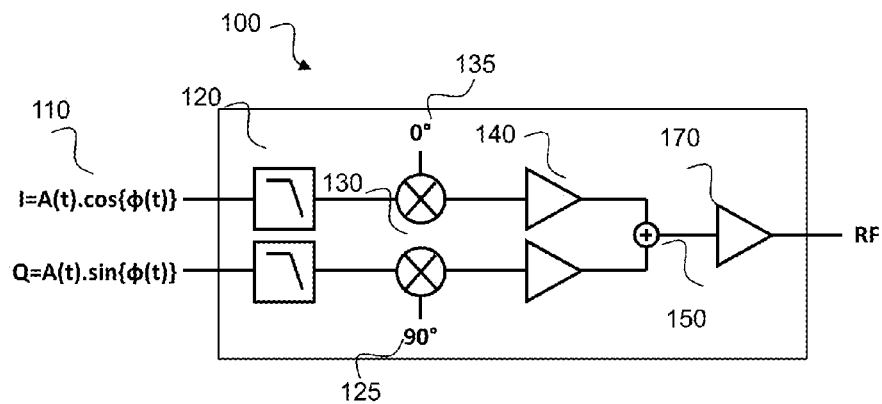
FIG. 1 - Prior Art
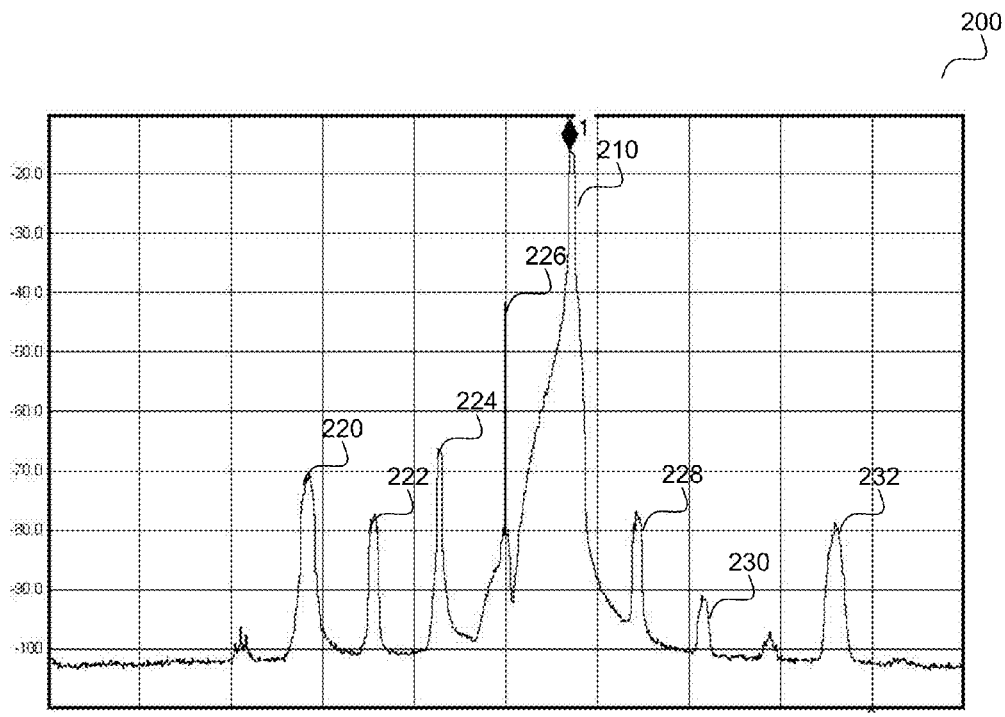
FIG. 2 - Prior Art

QUADRATURE TRANSMITTER, WIRELESS COMMUNICATION UNIT, AND METHOD FOR SPUR SUPPRESSION

FIELD OF THE INVENTION

The field of this invention relates generally to the field of transmitters in wireless communication units. In particular, the field of this invention relates to suppression of both counter intermodulation products and harmonic spurs.

BACKGROUND OF THE INVENTION

As new generations of handsets, and other wireless communication devices become embedded with more applications and complexity, there is a need for ever more integration. The trend in mobile radio communications is towards complex multi-radio systems comprised of several parallel transceivers. This implies a leap in complexity of the radio frequency (RF) front-end (FE) design. The RF circuits of wireless communication devices, and the transmitter parts in particular, are difficult to integrate.

Known transmitter architectures create undesired harmonics of transmit signals, due to the nonlinearity of each transmitter stage, e.g. an analog quadrature baseband circuit, an up-conversion mixer stage, the power amplifier (PA) stage, etc. This results in harmonic RF spurs being generated at the transmit output, which may not comply with out-of-band transmission specifications of wireless communication standards and thus impact the communication transmission and reception of other wireless communication units. Alternatively, or additionally, they may cause self-interference in other transceiver paths implemented in the same communication unit.

In particular, spurs may be generated around the frequency of the wanted/desired transmit signal, $\omega_0 + \omega_{bb}$, that are within the transmit band. Such undesired spurs and harmonic include the baseband image frequency at the RF, $\omega_0 - \omega_{bb}$, the local oscillator leakage, $\omega_0$ LO leakage, and multiple counter inter-modulation products (referred to as CIM spurs), such as third, fifth, seventh, … harmonics of the baseband signal located around the wanted/desired transmit signal, $\omega_0 - 3\omega_{bb}$, $\omega_0 + 5\omega_{bb}$. In particular, CIM spurs around the wanted signal severely degrade performance such as adjacent channel leakage rejection (ACLR) and spurious emissions. Counter $3^{rd}$ order and $5^{th}$ order intermodulation (CIM3/CIM5) components are known to be the most critical ones to cancel or remove, with the higher order CIM products being less significant.

Harmonic mixing at different TX stages generates/regenerates CIM products. As the harmonics are regenerated at each TX stage, it is necessary to suppress CIM products. Notably, due to the problematic effect that each active stage regenerates CIM products, even if they have been substantially cancelled or removed earlier in the transmit chain, all the stages of the transmitter need to be considered when attempting to remove the generated/regenerated CIM products.

Four known solutions of: Weldon, He, Vora and Ingels attempt to reduce harmonic spurs, each of which are based on essentially the same idea of sinewave approximation. By adding multiple signals with different phases and amplitudes, a first order sinewave approximation can be achieved. An amplitude scaling of √2 allows the use of phase shifts that are easy to generate and hence each of the known art that is identified below use √2 amplitude scaling in the signal path. One disadvantage common to these four solutions is that RF signals with different phases are combined directly, inevitably leading to power loss and hence reduction of transmitter efficiency.

FIG. 1 illustrates a known quadrature transmitter architecture 100. The transmitter architecture 100 comprises a quadrature (I/Q) baseband input signal 110. The I/Q baseband input signal 110 is input to quadrature up-mixer 130 via a respective low pass filter 120, which up-converts the I/Q baseband signal 110 in response to respective quadrature local oscillator (LO) signals 125, 135, there being a 90 degree phase shift between the respective quadrature LO signals. The up-converted quadrature signals are amplified in RF amplifiers 140 and both paths are summed at combiner 150. The combined signal is then amplified in power amplifier 170.

FIG. 2 provides a graphical illustration 200 of a wanted signal 210 and a multitude of spurs and harmonics that are created in known quadrature transmitters, that require careful attention when designing a transmitter architecture. The illustrated spurs and harmonics include LO leakage 226 ($\omega_0$), image spur 224, CIM3 spur 220 ($\omega_0 - 3\omega_{bb}$) and CIM5 spur 232 ($\omega_0 + 5\omega_{bb}$), as well as other $2^{nd}$ harmonic spurs 222 and 228 and $3^{rd}$ harmonic spur 230.

A transmitter architecture by M. Ingels et al., as described in "A multiband 40 nm CMOS LTE SAW-less modulator with −60 dBc C-IM3", published in the ISSCC digest of technical papers, p 338-339, February 2013, targets rejection/cancellation of only the C-IM3 product. For example, in Ingels, the CIM3 products from the three paths have three phases, 0, −90°, 135°. With a scaling factor of √2, the CIM3 tone is cancelled when the three signals are summed. Thus, Ingels (as well as other known techniques) describes an architecture that is capable of careful manipulation of quadrature signals to effect cancellation of one undesired transmit harmonic or spur, unfortunately leaving other strong harmonics and spurs that fail to meet a specific performance or may re-create undesired spurious emissions.

Therefore, known techniques for reducing or cancelling harmonic spurs, including CIM products, are less than ideal in that other harmonic spurs, including CIM products, are generated at sufficient levels to cause or potentially cause spurious emission issues.

SUMMARY OF THE INVENTION

Accordingly, the invention seeks to mitigate, alleviate or eliminate one or more of the above mentioned disadvantages, either singly or in any combination. Aspects of the invention provide a quadrature transmitter, a wireless communication unit and a method of spur reduction or cancellation, as described in the appended claims.

In accordance with a first aspect of the invention, a quadrature transmitter comprises: a first transmitter path and a second transmitter path that are matched. Each transmitter path comprises: at least one input arranged to receive respective first or second sets of quadrature baseband signals; at least one local oscillator, LO, port configured to receive respective first and second sets of quadrature LO signals; and at least one mixer stage coupled to the at least one input and configured to respectively multiply the sets of quadrature baseband signals with the respective first or second sets of quadrature LO signals to produce a respective output radio frequency, RF, signal. A combiner is configured to combine the output radio frequency signals of the first transmitter path and the second transmitter path. The first set of quadrature baseband signals is a substantially 45° phase shifted version of the second set of quadrature baseband signals; and the first set of quadrature LO signals is a reverse substantially 45° phase shifted version of the second set of quadrature LO signals.

In this manner, by implementing the aforementioned architecture, it is possible to reduce or cancel multiple problematic harmonic spurs, as well as CIM products.

In some optional examples, at least two sets of undesired radio frequency signals are anti-phase such that they are cancelled in the combiner.

In some optional examples, a single set of quadrature baseband signals is applied to both the first transmitter path and the second transmitter path, where only one of the first and second transmitter paths may comprise at least one baseband phase shifter coupled to the quadrature input and configured to provide a phase shifted by substantially ±45° representation of the input signal of the set of quadrature signals applied in the other transmitter path to its respective baseband input. In some optional examples, the baseband phase shift may be performed in a digital domain and the first and second transmitter path each comprise a set of digital to analog converters, DACs, configured to generate analog quadrature signals.

In some optional examples, the quadrature transmitter may further comprise at least one error correction circuit operably coupled to an input of a set of DACs configured to correct non-idealities in the set of quadrature analog signals between the first and second transmitter paths.

In some optional examples, each of the first transmitter path and second transmitter path comprises at least one error correction circuit operably coupled to an input of the at least one DAC, wherein the at least two error correction circuits may be configured to correct non-idealities on a respective first transmitter path or second transmitter path separately in a digital domain before or after a phase rotation of a set of quadrature analog signals in the digital domain.

In some optional examples, the quadrature transmitter may further comprise three error correction circuits operably coupled to an input of the at least one DAC wherein two error correction circuits are configured to correct mismatches within a respective first and second transmitter path and a third error correction circuit is configured to correct mismatches on both the first and second transmitter paths.

In some optional examples, one of the transmitter paths may include analog phase rotation where the single set of quadrature baseband signals is converted by a set of digital to analog converters, DACs, configured to generate analog quadrature signals. In some optional examples, at least one error correction circuit operably coupled to an input of the set of DACs configured to apply one or more corrections to the set of quadrature digital signals shared between the first and second transmitter paths In some optional examples, the quadrature transmitter may further comprise a controller coupled to first pairs of switches coupled to the baseband input of the second transmit path and second pairs of switches located on the LO path of the second transmitter path and configured to selectively reconfigure the second transmitter path to operate on the same set of LO and baseband signals as the first transmitter path.

In some optional examples, each of the first transmitter path and second transmitter path may be implemented as a plurality of sliced transmitter paths where the combiner is a power combiner located external to the first plurality of sliced RF modules and second plurality of sliced RF modules. In some optional examples, each of the first plurality of sliced RF modules and second plurality of sliced RF modules may comprise a second combiner configured to combine RF quadrature signals output by respective sliced RF modules.

In some optional examples, the quadrature transmitter may further comprise a controller coupled to a first pair of switches coupled to the baseband input of the second transmit path to provide the first set of quadrature baseband signals to each sliced RF module of the second transmitter path; and second pairs of switches located on the LO path of each respective sliced RF module of the second transmitter path and configured to selectively apply the reverse phase shifts to mixer stages on each sliced RF module of the second transmitter path.

In accordance with a second aspect of the invention, a communication unit comprising a quadrature transmitter that comprises: a first transmitter path and a second transmitter path that are matched and wherein each transmitter path comprises: at least one input arranged to receive respective first or second sets of quadrature baseband signals; at least one local oscillator, LO, port configured to receive respective first and second sets of quadrature LO signals; and at least one mixer stage coupled to the at least one input and configured to respectively multiply the sets of quadrature baseband signals with the respective first or second sets of quadrature LO signals to produce a respective output radio frequency, RF, signal; and a combiner configured to combine the output radio frequency signals of the first transmitter path and the second transmitter path. The first set of quadrature baseband signals is a substantially 45° phase shifted version of the second set of quadrature baseband signals; and the first set of quadrature LO signals is a reverse substantially 45° phase shifted version of the second set of quadrature LO signals.

In accordance with a third aspect of the invention, a method for a transmitter that comprises a first transmitter path and a second transmitter path that are matched, the method comprising: receiving a first set of quadrature baseband signals at the first transmitter path; receiving a second set of quadrature baseband signals at the second transmitter path; generating respective first and second sets of quadrature LO signals; multiplying the first and second sets of quadrature baseband signals with the respective first or second sets of quadrature LO signals to produce a respective output radio frequency, RF, signal; and combining the output radio frequency signals of the first transmitter path and the second transmitter path. The first set of quadrature baseband signals is a substantially 45° phase shifted version of the second set of quadrature baseband signals; and the first set of quadrature LO signals is a reverse substantially 45° phase shifted version of the second set of quadrature LO signals.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIG. 1 illustrates a known transmitter architecture, particularly some of the components that create undesired harmonics of transmit signals.

FIG. 2 illustrates a frequency response graph of a known transmitter architecture that highlights CIM products and harmonics and spurs that require cancelling or reducing.

DETAILED DESCRIPTION

Figure 4:
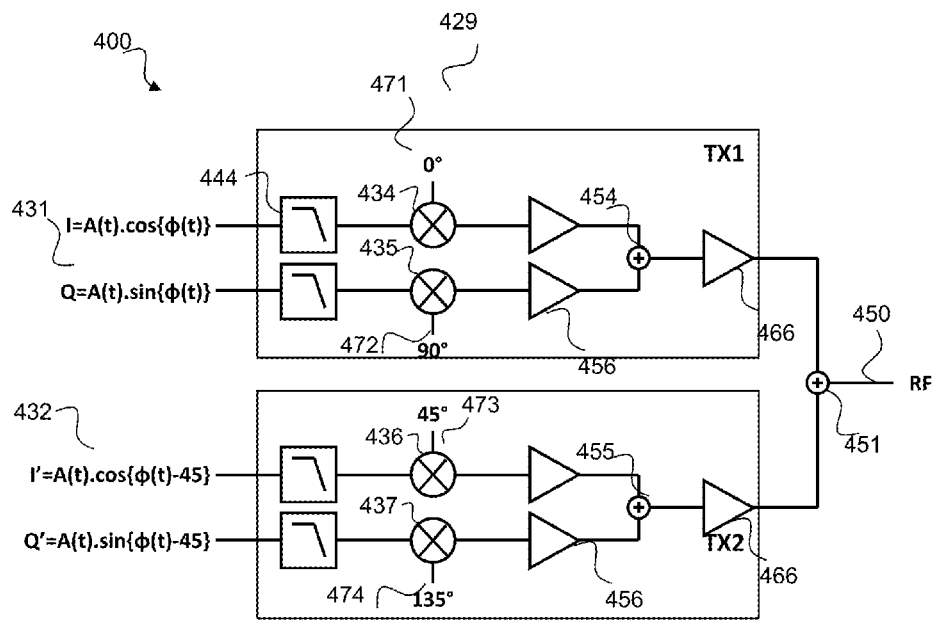
FIG. 4 illustrates an example overview of a transmitter architecture according to example embodiments of the invention.

Examples of the invention will be described in terms of direct conversion quadrature transmitters with at least two matched quadrature paths. Although most examples of the invention will be described in terms of a single-ended implementation, as shown in FIG. 4, it is envisaged that the concepts described herein may be equally applied to any differential or double-balanced implementation.

The inventors have recognised and appreciated that although the non-linearity of each block in FIG. 1 is an important figure of merit (FOM) for a transmitter design, ultimately what matters is the nonlinearity of the whole transmitter. Thus, when the respective quadrature signals are combined, undesired spurs, harmonics and CIM products should be cancelled at this point.

Examples of the invention will be described in terms of using two sets of quadrature (I/Q) signals with 45° phase offset for both baseband and LO. Notably, none of the examples of the invention employ any √2 signal path scaling. Further, no power loss of the transmit signal is incurred, since the desired signal from both (or multiple) quadrature paths is combined in-phase.

This invention can be applied to any transmitter path architecture. Furthermore, the spurs described here will be cancelled but depending on the architecture other harmonic spurs may exist that are not cancelled. The mixers described throughout this description can be advantageously implemented using any known mixer architecture, including active or passive mixers and voltage mode or current mode mixers.

Advantageously, with the various transmit architectures described herein, multiple problematic harmonics and CIM products that are generated or re-generated are cancelled, irrespective of where in the transmitter path the harmonics or CIM products occur.

Figure 3:
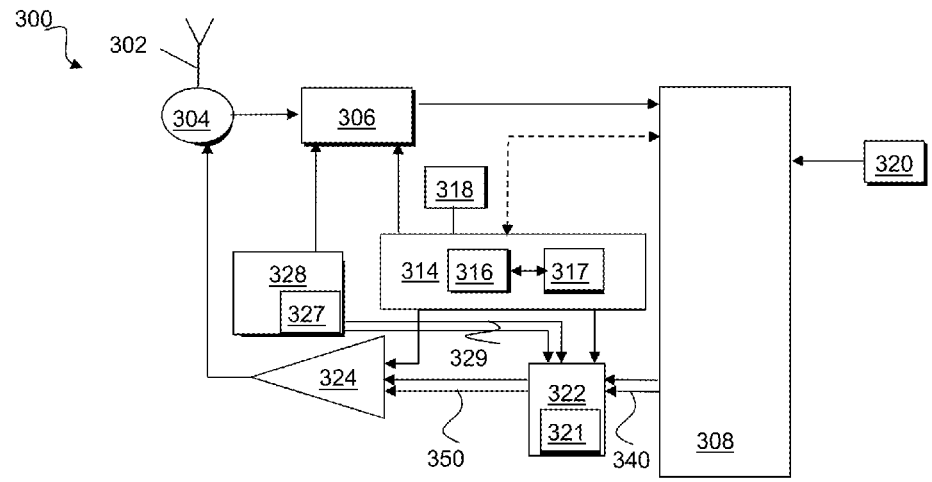
FIG. 3 illustrates a wireless communication unit comprising a transmitter architecture adapted according to a second example embodiment of the invention.

Referring now to FIG. 3, a block diagram of a wireless communication unit 300, adapted in accordance with some example embodiments of the invention, is shown. In practice, purely for the purposes of explaining embodiments of the invention, the wireless communication unit is described in terms of a wireless subscriber communication unit, which in some examples may be a smartphone.

The wireless communication unit 300 contains an antenna arrangement 302, for radiating signals and/or for receiving transmissions, coupled to an antenna switch or duplexer 304 that provides isolation between receive and transmit chains within the wireless communication unit 300.

One or more receiver chains, as known in the art, include(s) receiver front-end circuitry 306 (effectively providing reception, filtering and intermediate or base-band frequency conversion). The receiver front-end circuitry 306 is coupled to a signal processing module 308 (generally realized by a Digital Signal Processor (DSP)). A skilled artisan will appreciate that the level of integration of receiver circuits or components may be, in some instances, implementation-dependent.

A controller 314 maintains overall operational control of the wireless communication unit 300. The controller 314 is coupled to the receiver front-end circuitry 306 and the signal processing module 308. In some examples, the controller 314 is also coupled to a buffer module 317 and a memory device 316 that selectively stores operating regimes, such as information relating to quadrature phase and amplitude settings to be applied to components in the transmitter to suppress harmonic spurs and CIM products, and the like. A timer 318 is operably coupled to the controller 314 to control the timing of operations (e.g. transmission or reception of time-dependent signals) within the wireless communication unit 300.

The transmit chain includes transmitter/modulation circuitry 322 and a power amplifier 324 coupled to the antenna arrangement 302, which may comprise for example an antenna array, or plurality of antennas. The transmitter/modulation circuitry 322 and the power amplifier 324 are operationally responsive to the controller 314. In some examples, the signal processing module 308 and/or controller 314 may receive inputs from one or more input device or sensor modules 320.

Frequency generation circuit 328 is operably coupled to the receiver front-end circuitry 306 and the transmitter/modulation circuitry 322 and, in accordance with example embodiments, is arranged to provide quadrature local oscillator signals 329 of various phases thereto. In example embodiments, the transmit chain is a quadrature transmitter that comprises a first transmitter path and a second transmitter path that are matched. Each transmitter path comprises: at least one input arranged to receive respective first or second sets of quadrature baseband signals 340. Frequency generation circuit 328 comprises; at least one local oscillator, LO, 327 configured to generate respective first and second sets of quadrature LO signals 329; and at least one mixer stage 321 coupled to the at least one quadrature baseband input and configured to respectively multiply the sets of quadrature baseband signals 340 with the respective first or second sets of quadrature LO signals 329 to produce a respective output radio frequency, RF, signal(s) 350. A combiner is configured to combine the output radio frequency signals of the first transmitter path and the second transmitter path and may be located within the transmitter/modulation circuitry 322, or within a module supporting the power amplifier 324 or somewhere there between. Notably, in accordance with example embodiments, a first set of quadrature baseband signals is a 45° phase shifted version of the second set of quadrature baseband signals; and the first set of quadrature LO signals is a reverse 45° phase shifted version of the second set of quadrature LO signals.

In the context of the examples herein described harmonics and CIM products are arranged to be cancelled by combining the harmonics and products with corresponding out-of-phase harmonics and products. As understood to a skilled artisan, for example in the context of mixers, harmonics are generated in each mixer path, and these harmonics will have different phases as a result of a different BB phase and LO phase. The general concept of harmonic cancellation may be achieved eventually, when all the paths are summed at a combiner. At the summation point, if all undesired harmonics are summed to zero (i.e. the phase relationship cancels out the harmonics) harmonic cancellation is achieved.

In accordance with examples of the invention, a first set of quadrature baseband signals is configured to be a 45° phase shifted version of a second set of quadrature baseband signals; and a first set of quadrature LO signals is configured to be a reverse 45° phase shifted version of a second set of quadrature LO signals, such that when they are combined each of the respective undesired harmonics and CIM products are substantially cancelled.

Clearly, a number of the various components within the wireless communication unit 300 can be realized in discrete or integrated component form, with an ultimate structure therefore being application-specific or design-based.

Referring now to FIG. 4, an example of a transmitter architecture 400 adapted according to embodiments of the invention is described. It is envisaged that, in some examples, the two transmitter paths in FIG. 4 may include at least some part of conventional quadrature transmitters, whose signals passing there through have been adapted by careful and selective control of phase shifts.

The transmitter architecture 400 employs a +45 degree (e.g. π/4) phase shift at the LO, and a −45 degree (−π/4) phase shift at baseband (BB) (or vice versa as will be described later with reference to FIG. 5). In the example embodiments, CIM3 and CIM5 are advantageously cancelled, as well as $3^{rd}$ order harmonics, which would regenerate the CIM products in the subsequent PA stages.

The transmitter architecture 400 comprises a first quadrature (I/Q) baseband input signal 431. The first I/Q baseband input signal 431 includes a first quadrature signal I=A(t)·cos {φ(t)}) input to first quadrature up-mixer 434 and second quadrature signal (Q=A(t)·sin {φ(t)}) input to second quadrature up-mixer 435, which up-convert the first I/Q baseband input signals 431 in response to respective quadrature local oscillator (LO) signals 471, 472. There is a 90 degree phase shift between first quadrature LO signal 471 and second quadrature LO signal 472, as well as a 90 degree phase shift between the first quadrature 'I' signal and second quadrature 'Q' signal. Each of the up converted RF signals from mixers 434 and 435 are summed within the first quadrature transmitter path at 454.

In accordance with example embodiments of the invention, the transmitter architecture 400 further comprises a second quadrature (I/Q) baseband input signal 432 that includes a third quadrature signal (I'=A(t)·cos {φ(t)−45}) that is a 45 degree phase shifted version of the first quadrature signal I=A(t)·cos {φ(t)}) of the first I/Q baseband input signal 431. The second quadrature (I/Q) baseband input signal 432 also includes a fourth quadrature signal (Q'=A(t)·sin {φ(t)−45}) that is a 45 degree phase shifted version of the second quadrature signal (Q=A(t)·sin {φ(t)}) of the first I/Q baseband input signal 431.

The second I/Q baseband input signal 432 is input to respective third quadrature 436 and fourth quadrature 437. In accordance with example embodiments of the invention, third quadrature 436 receives the third quadrature signal (I'=A(t)·cos {φ(t)−45}) and the third quadrature local oscillator signal 473, which exerts a 45 degree phase shift to third quadrature signal (I'=A(t)·cos {φ(t)−45}), compared to the phase shift applied by the first quadrature local oscillator signal 471 to the first quadrature signal. In this manner, the third quadrature signal (I'=A(t)·cos {φ(t)−45}) is up-converted to a radio frequency (RF) signal by third quadrature local oscillator signal 473. In accordance with example embodiments of the invention, fourth quadrature 437 receives the fourth quadrature signal (Q'=A(t)·sin {φ(t)−45}) and the fourth quadrature local oscillator signal 474, which exerts a 45 degree phase shift to fourth quadrature signal (Q'=A(t)·sin {φ(t)−45}), compared to the phase shift applied by the second quadrature local oscillator signal 472 to the second quadrature signal. In this manner, the fourth quadrature signal (Q'=A(t)·sin {φ(t)−45}) is up-converted to a radio frequency (RF) signal by fourth quadrature local oscillator signal 474. Each of the up converted RF signals from mixers 436 and 437 are summed within the first quadrature transmitter path at 455.

Thereafter, signals on both first and second transmitter paths are summed at summing junction 451.

In some optional examples, the quadrature transmitter may further comprise a matched radio frequency amplifier circuit that includes at least two sets of matched radio frequency, RF, amplifiers, 456 each set of matched RF amplifiers 456 being connected to a respective first transmitter path or second transmitter path. In some optional examples, the quadrature transmitter may further comprise a matched filter circuit that includes at least two sets of matched filters 444, each set of matched filters 444 being connected to a respective first transmitter path or second transmitter path. In some optional examples, the quadrature transmitter may further comprise a matched radio frequency amplifier circuit that includes a set of matched radio frequency, RF, amplifiers, 466 located after each transmitter path quadrature signal has been combined, and before the two transmitter paths are combined at summing junction 451.

In the various architectures described herein, the nonlinearity of each transmitter function may be modelled as follows, where, with reference to FIG. 4, $V_{ABB}$ describes the quadrature baseband signals after baseband filters 444, $V_{mix}$ describes the output signals of mixers 434, 435, 436 or 437 and $V_{PAD}$ describes the RF signals at the output of amplifiers 466:

$$V_A = u_0 + u_1 V_i + u_2 V_i^2 + u_3 V_i^3 + \quad [1]$$

$$V_m = (b_0 + b_1 V_A + b_2 V_A^2 + b_3 V_A^3 + \ldots)(\Sigma \alpha_n \cos(n) + \Sigma \beta_n \sin(n)) \quad [3]$$

$$V_P = c_0 + c_1 V_m + c_2 V_m^2 + c_3 V_m^3 + \quad [3]$$

It is noteworthy that, in the modelling above, a Taylor series is used to model the nonlinearity. If memory effects need to be taken into account, other techniques such as Volterra series may be used instead. However, for the purpose of the discussion herein, memory effects do not introduce fundamental differences. Therefore for simplicity, Taylor series will be used throughout this discussion. The LO waveform may be modelled using Fourier series, as appreciated by skilled artisans.

From such modelling, it is known that every single harmonic component has multiple contributors. For example, if we take CIM3, which is at frequency of $\varphi_{LO}-\omega_{BB}$, it is noted that amongst its multiple generating mechanisms, it can be created as a result of ABB $3^{rd}$ order nonlinearity mixing with LO fundamental tone. Similarly, CIM3 can be created as a result of ABB $2^{nd}$ order nonlinearity mixing with LO $2^{nd}$ harmonic and then mixing with the wanted signal through PA driver amplifier (PAD) $2^{nd}$ nonlinearity, etc. Due to the fact that there are so many mechanisms to generate CIM3, it is impractical to go through every single mechanism and find a cancellation solution for each of them. In other words, in order to suppress the CIM3 or any other harmonic component, a solution to fix all the possible mechanisms at once is advantageous.

One interesting property of the signal path is that, if a phase shift $\varphi$ is introduced at an analog quadrature baseband (ABB) input $V_i$, the phase shift at the signal path output is $n\varphi$ for any harmonic components at a frequency of $m\omega_{LO}+n\omega_{BB}$. In the same way, a phase shift $\theta$ introduced at an LO, results in a phase shift at the signal path output of $m\theta$ for harmonic components at a frequency of $m\omega_{LO}+n\omega_{BB}$.

An extra identical signal path can be introduced, with the outputs being summed either in voltage or current. With a correct phase shift introduced on both the LO and ABB input of the identical path, if the original signal path and the secondary signal path are substantially matched, then a perfect cancellation of those harmonics that are completely out of phase in one path compared to the other path can be achieved.

Herein, in the various illustrated architectures, we propose a $\pi/4$ phase shift on the LO and $-\pi/4$ phase shift on the ABB input on the secondary signal path, for example. With these phase shifts, it can be easily shown that, for CIM3, the phase shift on the secondary path output is $\pi/4-(-\pi/4)*3=\pi$. Similarly, for a CIM5 product (a harmonic spur at $\omega_{LO}+5\omega_{BB}$), the phase shift on the secondary path output is $\pi/4+(-\pi/4)*5=-\pi$. As both these phases are exactly out of phase compared to the first path, CIM3 and CIM5 will be cancelled out at the summed output of the two matched transmitter paths.

Whilst the CIM3/CIM5 products are being cancelled, the wanted signal ($\omega_{LO}+\omega_{BB}$) at the secondary path has a phase shift of $\pi/4+(-\pi/4)=0$, which means the wanted signal on the two transmitter paths are in phase. Thus, there is advantageously no power loss for the wanted signal when the outputs of the two transmitter paths are summed.

It is not usually desirable to include the PA's into the cancellation path. We also would like to suppress the harmonics (which themselves are not at CIM3/CIM5 frequencies), but will regenerate CIM3/CIM5 at the PA output due to PA nonlinearity if not dealt with earlier. Amongst them, the critical harmonics are known to be at $3\omega_{LO}-\omega_{BB}$, which generates CIM3, and at $3\omega_{LO}+7\omega_{BB}$, which generates CIM5. These tones are also cancelled out in a similar way as the CIM3/CIM5 cancellation described above. The phase shift for the $3\omega_{LO}-\omega_{BB}$ tone in the second transmitter path is $(\pi/4)*3-(-\pi/4)=\pi$ which again is out of phase compared to the first transmitter path. Similarly, the phase shift for the $3\omega_{LO}+7\omega_{BB}$ tone in the second transmitter path is $(\pi/4)*3+(-\pi/4)*7=-\pi$. Hence, these undesired terms may also be cancelled.

Thus, the techniques described herein substantially cancel out both CIM3 and CIM5 products from the transmitter path output, without any sacrifice of power efficiency. Advantageously, the techniques described herein also substantially suppress the harmonic spurs that will re-generate CIM3/CIM5 at the PA output. In this manner, a solution is provided to substantially prevent the generation of CIM3, CIM5 and $3^{rd}$ harmonic products for the whole transmitter system, irrespective of whether the undesired products are created earlier as they are ultimately cancelled out.

Thus, for example in the architecture of FIG. 4 (and the others described later), it can be shown that harmonic rejection of the CIM3 and CIM5 products, as well as suppression of harmonic spurs (that could subsequently lead to re-generation of CIM3 and CIM5 products) can be achieved in this circuit.

Figure 5:
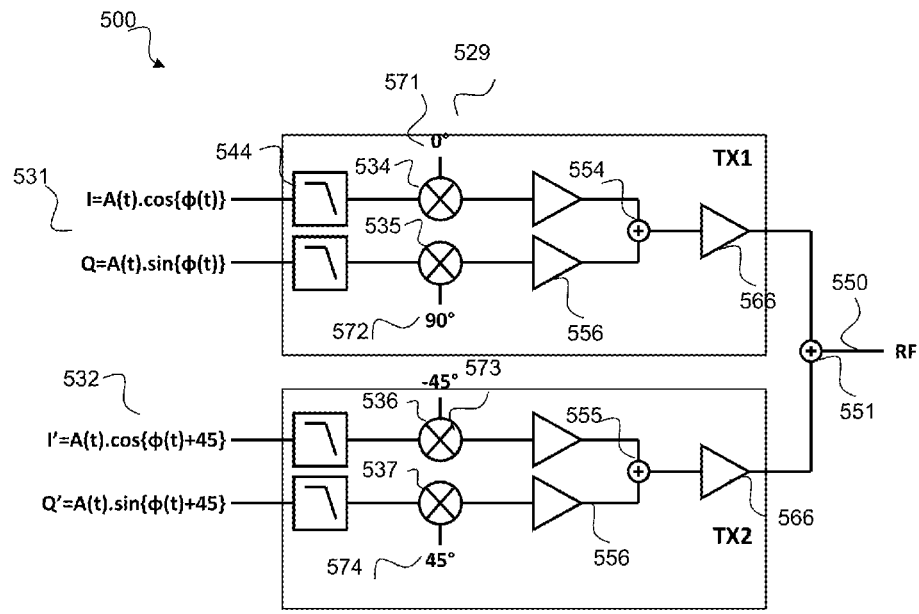
FIG. 5 illustrates an example overview of an alternative transmitter architecture embodiment using opposite polarity rotation on the secondary signal path on both the BB and LO, according to example embodiments of the invention.

FIG. 5 illustrates an example overview of an alternative transmitter architecture embodiment using opposite polarity rotation on the secondary signal path on both the BB and LO, according to example embodiments of the invention.

The transmitter architecture 500 employs a −45 degree (e.g. $-\pi/4$) phase shift at the LO, and a +45 degree ($+\pi/4$) phase shift at baseband (BB). In the example embodiments, CIM3 and CIM5 are advantageously cancelled, as well as $3^{rd}$ order harmonics, which could regenerate the CIM products and further harmonics in the subsequent transmit chain stages, if not supressed. Thus, some examples of the inventive concept propose both a +45 degree phase shift at BB and a −45 degree at LO, compared to the conventional quadrature (IQ) transmitter.

The transmitter architecture 500 comprises a first quadrature (I/Q) baseband input signal 531. The first I/Q baseband input signal 531 includes a first quadrature signal (I=A(t)·cos $\{\varphi(t)\}$) input to first quadrature up-mixer 534 and second quadrature signal (Q=A(t)·sin $\{\varphi(t)\}$) input to second quadrature up-mixer 535, which up-converts the first I/Q baseband signals 531 in response to respective quadrature local oscillator (LO) signals 571, 572. There is a 90 degree phase shift between first quadrature LO signal 571 and second quadrature LO signal 572. Each of the up converted RF signals from mixers 534 and 535 are summed within the first quadrature transmitter path at 554.

In accordance with example embodiments of the invention, the transmitter architecture 500 further comprises a second quadrature (I/Q) baseband input signal 532 that includes a third quadrature signal (I'=A(t)·cos $\{\varphi(t)+45\}$) that is a 45 degree phase shifted version of the first quadrature signal (I=A(t)·cos $\{\varphi(t)\}$) of the first I/Q baseband input signal 531. The second quadrature (I/Q) baseband input signal 532 also includes a fourth quadrature signal (Q'=A(t)·sin $\{\varphi(t)+45\}$) that is a 45 degree phase shifted version of the second quadrature signal (Q=A(t)·sin $\{\varphi(t)\}$) of the first I/Q baseband input signal 531.

The second I/Q baseband input signal 532 is input to respective third quadrature 536 and fourth quadrature 537. In accordance with example embodiments of the invention, third quadrature 536 receives the third quadrature signal (I'=A(t)·cos $\{\varphi(t)+45\}$) and the third quadrature local oscillator signal 573, which exerts a −45 degree phase shift to third quadrature signal (I=A(t)·cos $\{\varphi(t)+45\}$), compared to the phase shift applied by the first quadrature local oscillator signal 571 to the first quadrature signal. In this manner, the third quadrature signal (I'=A(t)·cos $\{\varphi(t)+45\}$) is up-converted to a radio frequency (RF) signal by third quadrature local oscillator signal 573. In accordance with example embodiments of the invention, fourth quadrature 537 receives the fourth quadrature signal (Q'=A(t)·sin {φ(t)+45}) and the fourth quadrature local oscillator signal 574, which exerts a −45 degree phase shift to fourth quadrature signal (Q'=A(t)·sin {φ(t)+45}), compared to the phase shift applied by the second quadrature local oscillator signal 572 to the second quadrature signal. In this manner, the fourth quadrature signal (Q'=A(t)·sin {φ(t)+45}) is up-converted to a radio frequency (RF) signal by fourth quadrature local oscillator signal 574. Each of the up converted RF signals from mixers 536 and 537 are summed within the first quadrature transmitter path at 555.

Thereafter, signals on both first and second transmitter paths are summed at summing junction 551. In some optional examples, the quadrature transmitter may further comprise a matched radio frequency amplifier circuit that includes at least two sets of matched radio frequency, RF, amplifiers, 556 each set of matched RF amplifiers 556 being connected to a respective first transmitter path or second transmitter path. In some optional examples, the quadrature transmitter may further comprise a matched filter circuit that includes at least two sets of matched filters 544, each set of matched filters 544 being connected to a respective first transmitter path or second transmitter path. In some optional examples, the quadrature transmitter may further comprise a matched radio frequency amplifier circuit that includes a set of matched radio frequency, RF, amplifiers, 566 located after each transmitter path quadrature signal has been combined, and before the two transmitter paths are combined at summing junction 551.

Figure 6:
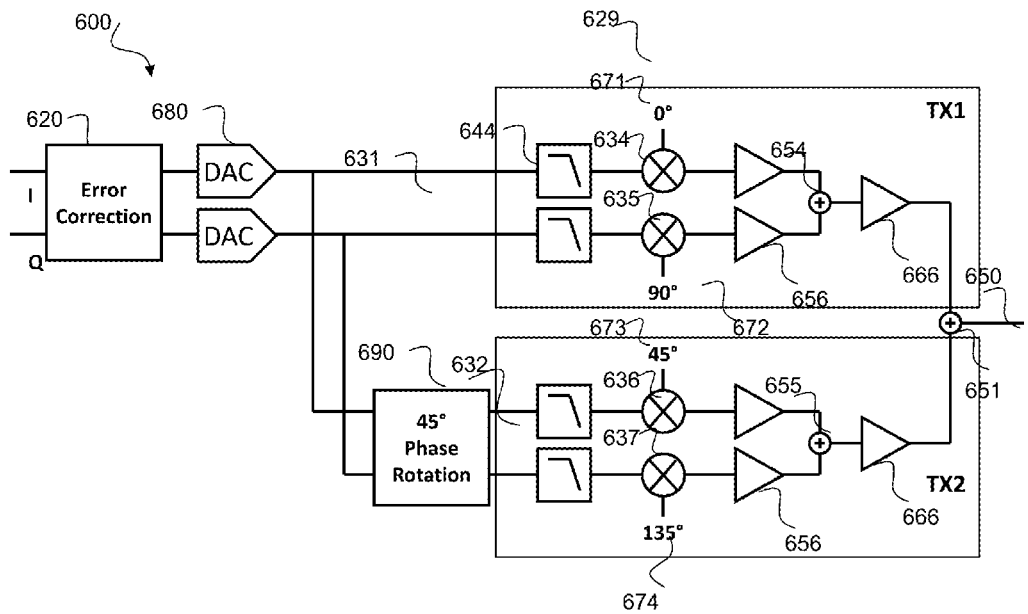
FIG. 6 illustrates an example overview of a yet further alternative transmitter architecture using one pair of DACs and analog BB phase rotation according to example embodiments of the invention.

FIG. 6 illustrates an example overview of a yet further alternative transmitter architecture using one pair of DACs and analog quadrature baseband (BB) phase rotation according to example embodiments of the invention. In the example embodiments, CIM3 and CIM5 are again advantageously cancelled, as well as $3^{rd}$ order harmonics, which could regenerate the CIM products and further harmonics in the subsequent transmit chain stages, if not supressed. Again, the transmitter architecture 600 employs a 45 degree (e.g. −π/4) phase shift at the LO, and a reverse 45 degree (π/4) phase shift at baseband (BB). In this example, the directions of the phase rotation are not specified, as it can be appreciated that the BB and LO respectively apply reverse (i.e. opposite) 45 degree phase rotations.

The transmitter architecture 600 comprises a first quadrature (I/Q) baseband input signal 631. The first and second I/Q baseband input signals 631, 632 may be subjected to error correction in the digital domain in error correction circuit 620 and then converted into the analog domain by a pair of digital-to-analog converters (DACs) 680. Thus, in essence in this example, the error correction circuit 620 applies corrections to a single I/Q baseband input signal of a composite transmit system implemented with two paths. In this example, the analog first I/Q baseband input signal 631 is then input to a baseband 45 degree phase rotation circuit 690 that imparts a 45 degree phase rotation to the input signal to create an analog second I/Q baseband input signal 632. In the same manner as FIG. 4 and FIG. 5, analog first I/Q baseband input signal 631 is input to first quadrature up-mixers 634, 635, which up-convert the first I/Q baseband signals 631 in response to respective quadrature local oscillator (LO) signals. There is a 90 degree phase shift between first quadrature LO signal 671 and second quadrature LO signal 672. Each of the up converted RF signals from mixers 634 and 635 are summed within the first quadrature transmitter path at 654.

In accordance with example embodiments of the invention, the analog second I/Q baseband input signal 632 includes a third quadrature signal that is a 45 degree phase shifted version of the first quadrature signal of the analog first I/Q baseband input signal 631. The analog second I/Q baseband input signal 632 also includes a fourth quadrature signal that is a 45 degree phase shifted version of the second quadrature signal of the analog first I/Q baseband input signal 631.

The second I/Q baseband input signal 632 is input to respective third quadrature 636 and fourth quadrature 637. In accordance with example embodiments of the invention, third quadrature 636 receives the third quadrature signal and the third quadrature local oscillator signal 673, which exerts a reverse 45 degree phase shift to the third quadrature signal, compared to the phase shift applied by the first quadrature local oscillator signal 671 to the first quadrature signal. In this manner, the third quadrature signal is up-converted to a radio frequency (RF) signal by third quadrature local oscillator signal 673. In accordance with example embodiments of the invention, fourth quadrature 637 receives the fourth quadrature signal and the fourth quadrature local oscillator signal 674, which exerts a reverse 45 degree phase shift to the fourth quadrature signal, compared to the phase shift applied by the second quadrature local oscillator signal 672 to the second quadrature signal. In this manner, the fourth quadrature signal is up-converted to a radio frequency (RF) signal by fourth quadrature local oscillator signal 674. Each of the up converted RF signals from mixers 636 and 637 are summed within the first quadrature transmitter path at 655.

Thereafter, signals on both first and second transmitter paths are summed at summing junction 651. In some optional examples, the quadrature transmitter may further comprise a matched radio frequency amplifier circuit that includes at least two sets of matched radio frequency, RF, amplifiers, 656 each set of matched RF amplifiers 656 being connected to a respective first transmitter path or second transmitter path. In some optional examples, the quadrature transmitter may further comprise a matched filter circuit that includes at least two sets of matched filters 644, each set of matched filters 644 being connected to a respective first transmitter path or second transmitter path. In some optional examples, the quadrature transmitter may further comprise a matched radio frequency amplifier circuit that includes a set of matched radio frequency, RF, amplifiers, 666 located after each transmitter path quadrature signal has been combined, and before the two transmitter paths are combined at summing junction 651.

It can be shown that rejection of the CIM3 and CIM5 products, as well as suppression of $3^{rd}$ harmonic spurs can be achieved. In some examples, the use of a single pair of DACs reduces the part count, albeit that the phase rotation has to be in an analog domain, which may introduce extra noise and may degrade SNR. In some applications, this trade-off may be advantageous.

Figure 7:
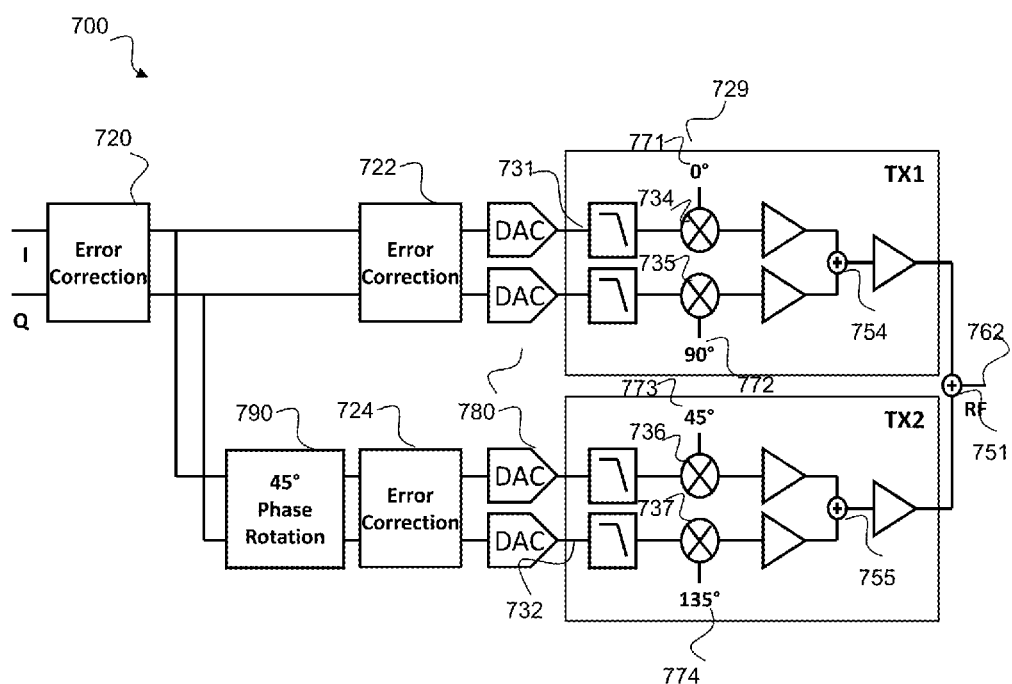
FIG. 7 illustrates an example overview of a still yet further alternative embodiment using two pairs of DACs and digital BB phase rotation (with optional error correction on each transmitter path), according to example embodiments of the invention.

FIG. 7 illustrates an example overview of a still yet further alternative embodiment using two pairs of DACs and digital BB phase rotation (with optional error correction on each transmitter path), according to example embodiments of the invention. In the example embodiments, CIM3 and CIM5 are again advantageously cancelled, as well as $3^{rd}$ order harmonics, which could regenerate the CIM products and further harmonics in the subsequent transmit chain stages, if not supressed. Again, the transmitter architecture 700 employs a 45 degree (π/4) phase shift at the LO, and a reverse 45 degree (π/4) phase shift at baseband (BB). In this example, the directions of the phase rotation are not specified, as it can be appreciated that the BB and LO respectively apply reverse (i.e. opposite) 45 degree phase rotations.

The transmitter architecture 700 comprises a first quadrature (I/Q) baseband input signal 731. In this example, the first and second I/Q baseband input signals 731, 732 may be subjected to a first (optional) batch of error correction in the digital domain in error correction circuit 720. Thus, in essence in this example, the error correction circuit 720 applies corrections to a single quadrature baseband input signal, of a composite transmit system implemented with two paths, before phase rotation.

The error corrected first I/Q baseband input signal is then split such that it also creates a first digital I/Q baseband input signal and a second digital I/Q baseband input signal. The first and second digital I/Q baseband input signals are routed to two separate second error correction circuits 722, 724, respectively located in first and second transmitter paths. In the first transmitter path, after being subjected to the separate second batch of error correction in the digital domain in error correction circuit 722, first quadrature (I/Q) baseband input signal 731 is then converted into the analog domain by a pair of digital-to-analog converters (DACs) 780. In the same manner as FIG. 4 and FIG. 5, analog first I/Q baseband input signal 731 is input to first quadrature up-mixers 734, 735, which up-convert the first I/Q baseband signals 731 in response to respective quadrature local oscillator (LO) signals. There is a 90 degree phase shift between first quadrature LO signal 771 and second quadrature LO signal 772. Each of the up converted RF signals from mixers 734 and 735 are summed within the first quadrature transmitter path at 754.

In this example, after first error correction in the digital domain in error correction circuit 720 the single, common, digital I/Q baseband input signal (for a composite transmit system) is input to a digital baseband 45 degree phase rotation circuit 790 that imparts a 45 degree phase rotation to the input signal to create a second digital I/Q baseband input signal. Thereafter, the second digital I/Q baseband input signal is input to a third error correction circuit 724 and converted to analog form in DACs 780 to produce analog second I/Q baseband input signals 732 for the second transmit path.

In accordance with example embodiments of the invention, the analog second I/Q baseband input signal 732 includes a third quadrature signal that is a 45 degree phase shifted version of the first quadrature signal of the analog first I/Q baseband input signal 731. The analog second I/Q baseband input signal 732 also includes a fourth quadrature signal that is a 45 degree phase shifted version of the second quadrature signal of the analog first I/Q baseband input signal 731.

In some examples, the configuration to use separate error correction blocks 722, 724 may be used to correct different imperfections in the first and second transmit paths, as well as any mismatch between the first and second transmit path. This ensures that the first and second transmit paths are substantially matched in order to achieve the best possible cancellation of CIM3/CIM5 as well as $3^{rd}$ order harmonics products. The optional error correction 720 at the common single baseband input for the composite system can be used to apply further corrections to improve signal quality of the composite system. In one example correction blocks 722, 724 may correct gain and phase errors in the first and second transmit path, whilst common correction block 720 may correct the channel response (e.g. asymmetry and ripple) of a composite system.

In the second transmitter path, after being subjected to the separate second batch of error correction in the digital domain in error correction circuit 724, second quadrature (I/Q) baseband input signal 732 is then converted into the analog domain by a pair of digital-to-analog converters (DACs) 780.

The second I/Q baseband input signal 732 is input to respective third quadrature 736 and fourth quadrature 737. In accordance with example embodiments of the invention, third quadrature 736 receives the third quadrature signal and the third quadrature local oscillator signal 773, which exerts a reverse 45 degree phase shift to the third quadrature signal, compared to the phase shift applied by the first quadrature local oscillator signal 771 to the first quadrature signal. In this manner, the third quadrature signal is up-converted to a radio frequency (RF) signal by third quadrature local oscillator signal 773. In accordance with example embodiments of the invention, fourth quadrature 737 receives the fourth quadrature signal and the fourth quadrature local oscillator signal 774, which exerts a reverse 45 degree phase shift to the fourth quadrature signal, compared to the phase shift applied by the second quadrature local oscillator signal 772 to the second quadrature signal. In this manner, the fourth quadrature signal is up-converted to a radio frequency (RF) signal by fourth quadrature local oscillator signal 774. Each of the up converted RF signals from mixers 736 and 737 are summed within the first quadrature transmitter path at 755.

Thereafter, signals on both first and second transmitter paths are summed at summing junction 751. In some optional examples, the quadrature transmitter may further comprise a matched radio frequency amplifier circuit that includes at least two sets of matched radio frequency, RF, amplifiers, each set of matched RF amplifiers being connected to a respective first transmitter path or second transmitter path. In some optional examples, the quadrature transmitter may further comprise a matched filter circuit that includes at least two sets of matched filters, each set of matched filters being connected to a respective first transmitter path or second transmitter path. In some optional examples, the quadrature transmitter may further comprise a matched radio frequency amplifier circuit that includes a set of matched radio frequency, RF, amplifiers, located after each transmitter path quadrature signal has been combined, and before the two transmitter paths are combined at summing junction 751.

It can be shown that rejection of the CIM3 and CIM5 products, as well as suppression of 3rd harmonic spurs can be achieved. In some examples, when using separate DACs and where digital phase rotation is employed, and where error correction circuits are separated with at least one per path, the signal-to-noise ratio (SNR) of the transmit system may be better, or alternatively the noise specification may be advantageously relaxed for the DACs.

Figure 8:
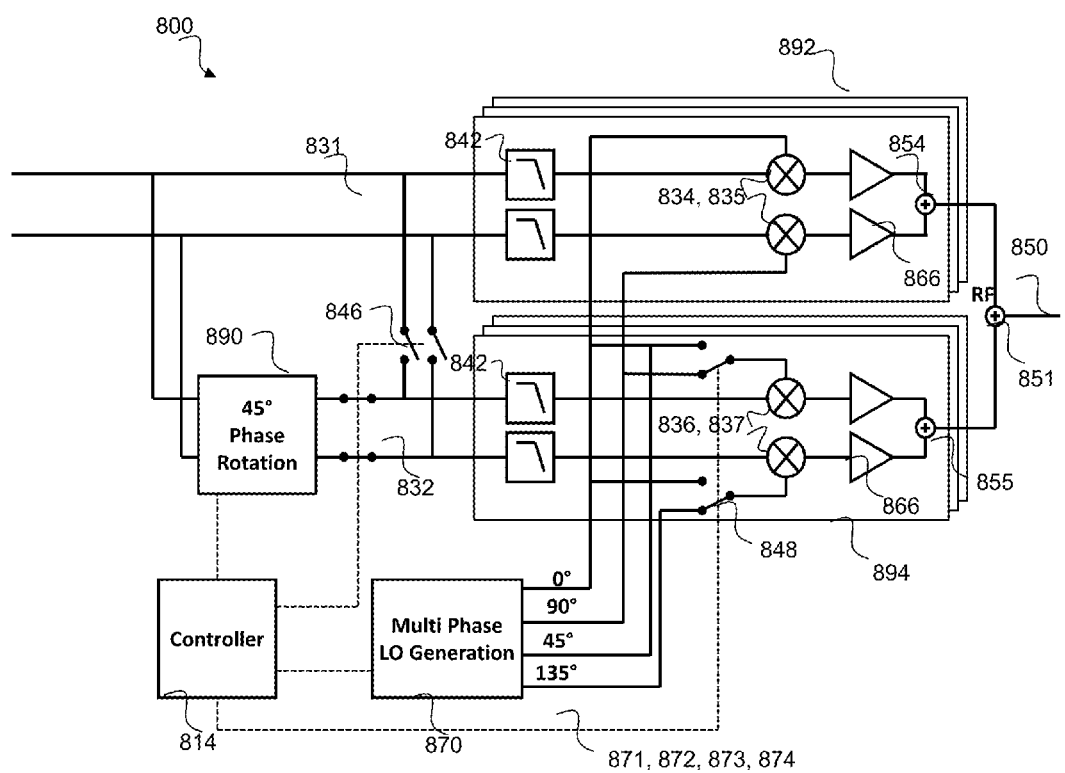
FIG. 8 illustrates an example overview of a still yet further alternative embodiment where a sliced transmitter can be selectively reconfigured to perform the harmonic/spur rejection or cancellation according to example embodiments of the invention.

FIG. 8 illustrates an example overview of a still yet further alternative embodiment where a sliced transmitter architecture 800 can be selectively reconfigured to perform the harmonic/spur rejection or cancellation according to example embodiments of the invention. In this example, FIG. 8 introduces two additional new features, namely slicing and reconfiguration, each of which may be used in some example architectures in isolation, or independently in an architecture that uses both features.

In this example, some baseband circuitry and a large portion of the RF circuitry is implemented on each of a plurality of slices. Notably, the plurality of slices are divided between a plurality of first transmitter path slices 892 and a plurality of second transmitter path slices 894 with the multiple outputs from both first transmitter path slices 892 and second transmitter path slices 894 being combined in summing junction 851 to form an output RF signal 850.

The sliced transmitter architecture 800 is configured such that one or more of a number of respective transmitter slices may be selectively enabled, in each transmitter path. In this illustrative example, each respective transmitter slice 892, 894 comprises matched filters 842, quadrature up-mixer stages 834, 835, 836, 837, matched amplifiers 866 and quadrature combiners 854, 855.

In the example sliced transmitter architecture 800, a yet further alternative transmitter architecture is illustrated that uses a 45 degree ($\pi/4$) phase shift at the LO, and a reverse 45 degree ($\pi/4$) phase shift at the quadrature baseband (BB). In this example, the directions of the phase rotation are not specified, as it can be appreciated that the BB and LO respectively apply reverse (i.e. opposite) 45 degree phase rotations.

The transmitter architecture 800 comprises a first quadrature (I/Q) baseband input signal 831. In this example, the first I/Q baseband input signal 831 is then input to a baseband 45 degree phase rotation circuit 890 that imparts a 45 degree phase rotation to the input signal to create an second I/Q baseband input signal 832. In the same manner as FIG. 4 and FIG. 5, first I/Q baseband input signal 831 is input to first quadrature up-mixers 834, 835, in each first transmitter slice 892, which up-convert the first I/Q baseband signals 831 in response to respective quadrature local oscillator (LO) signals. There is a 90 degree phase shift between first quadrature LO signal 871 and second quadrature LO signal 872 that are provided by multi-phase LO generation circuit 870. Each of the up converted RF signals from mixers 834 and 835 are summed within the first quadrature transmitter path at 854.

In accordance with example embodiments of the invention, the (phase shifted) second I/Q baseband input signal 832 includes a third quadrature signal that is a 45 degree phase shifted version of the first quadrature signal of the first I/Q baseband input signal 831. The second I/Q baseband input signal 832 also includes a fourth quadrature signal that is a 45 degree phase shifted version of the second quadrature signal of the first I/Q baseband input signal 831.

The second I/Q baseband input signal 832 is input to respective third quadrature 836 and fourth quadrature 837. In accordance with example embodiments of the invention, third quadrature 836 receives the third quadrature signal and the third quadrature local oscillator signal 873, which exerts a reverse 45 degree phase shift to the third quadrature signal, compared to the phase shift applied by the first quadrature local oscillator signal 871 to the first quadrature signal.

In this manner, the third quadrature signal is up-converted to a radio frequency (RF) signal by a third quadrature local oscillator signal 873. In accordance with example embodiments of the invention, fourth quadrature 837 receives the fourth quadrature signal and the fourth quadrature local oscillator signal 874, which exerts a reverse 45 degree phase shift to the fourth quadrature signal, compared to the phase shift applied by the second quadrature local oscillator signal 872 to the second quadrature signal. In this manner, the fourth quadrature signal is up-converted to a radio frequency (RF) signal by fourth quadrature local oscillator signal 874. Each of the up converted RF signals from mixers 836 and 837 are summed within the first quadrature transmitter path at 855.

Thereafter, transmitter signals on both first and second transmitter paths, selected from one or multiple slices, are summed at summing junction 851. In some optional examples, the quadrature transmitter may further comprise a matched radio frequency amplifier circuit that includes at least two sets of matched radio frequency, RF, amplifiers, each set of matched RF amplifiers being connected to a respective first transmitter path or second transmitter path. In some optional examples, the quadrature transmitter may further comprise a matched filter circuit 842 on each slice that includes at least one set of matched filters, each set of matched filters being located on a respective first transmitter path or second transmitter path. In some optional examples, the quadrature transmitter may further comprise a matched radio frequency amplifier circuit that includes a set of matched radio frequency, RF, amplifiers, 866 located on each slice before (as shown) or after each transmitter path quadrature signal has been combined, and before the two transmitter paths are combined at summing junction 851.

In accordance with the sliced transmitter architecture of FIG. 8, in one example, the sliced architecture may benefit from a controller 814 that is able to switch on/off various sliced paths and various phase rotations options, if it is not needed or if they are not needed. By switching off the baseband 45 degree phase shift rotation circuit 890 and the use of the reverse 45 degree phase shift rotation imparted by multi-phase LO generation circuit 870, the transmitter may be selectively reconfigured to perform as a conventional transmitter.

In some examples, it is recognised that spurious emissions are deterministic, and thus controller 814 may be arranged to turn cancellation on/off based on known band information.

It can be shown that harmonic rejection of the CIM3 and CIM5 products, as well as suppression of $3^{rd}$ harmonic spurs can be achieved. Table 1 illustrates the improvements provided by the example embodiments described herein, as compared to the known art of Ingels.

TABLE 1

|  | Prior art of Ingels LO BB ± 45 deg. | Examples described herein using LO ± 45 deg. + BB ± 45 deg. |
|---|---|---|
| LO phase (single ended) | 2 | 4 |
| BB phase (single ended) | 4 | 4 |
| CIM3 | Cancel | Cancel |
| CIM5 | Remain | Cancel |
| 2flo − 2fbb | Remain | Generated CIM3 cancelled |
| 3flo − fbb | Remain | Cancel |
| 3flo + 7fbb | Remain | Cancel |
| Power Loss | Significant | No loss |

In some examples, the use of slicing reduces overall power consumption and provides increased flexibility and programmability, as respective slices can be enabled/disabled. In some applications, this trade-off of increased part count (due to multiple slices) may be advantageous.

Although FIG. 8 is illustrated with regard to slicing only for the up-mixer and programmable gain amplifier re-configurability, it is envisaged that in other examples the slices may be extended to include sets of DACs and in some examples the analog quadrature baseband components.

Figure 9:
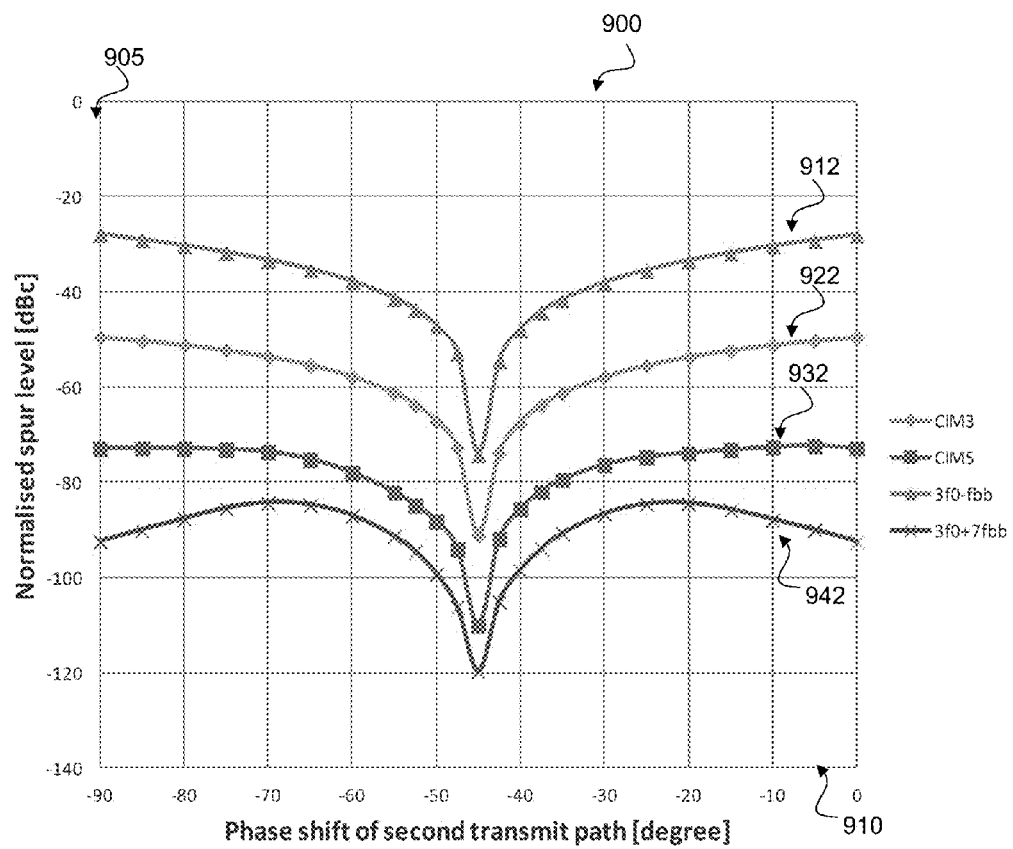
FIG. 9 illustrates a graphical example of a simulation of phase sensitivity highlighting the attenuation applied to respective multiple harmonics or spurs, according to example embodiments of the invention.

FIG. 9 illustrates a graphical example 900 of a simulation of phase sensitivity, highlighting the attenuation achieved for respective multiple harmonics or spurs, according to example embodiments of the invention. The X-axis 910 shows the phase shift applied to the quadrature baseband input and LO input (reverse shift) of the second transmitter path with respect to the quadrature baseband input and LO input of the first transmitter path. The Y-axis 905 shows the level of undesired CIM3, CIM5 and $3^{rd}$ harmonic spurs at the output of the transmitter system relative to the desired output signal in dBc. With a relative phase shift of zero degrees between the first transmitter path and second transmitter path the system essentially reverts to a traditional quadrature transmitter. Hence points on the right hand side of FIG. 9 at zero degrees can be interpreted as the performance of a traditional transmit architecture. As described in detail for several example embodiments in the earlier description, FIG. 9 clearly demonstrates that significant rejection of CIM3, CIM5 and $3^{rd}$ harmonic products is achieved for a relative phase shift of 45 degrees. For instance, the CIM3 product represented by line 922 shows a performance of −50 dBc for a traditional transmit architecture without phase shift but improves by 40 dB to −90 dBc when 45 degree phase shift is applied. Similarly, the CIM5 product 932, the (3fo–fbb) product 912 and the (3fo+7fbb) product 942 are all attenuated by 35-40 dB when 45 degree phase shift is applied.

As illustrated, the spur and harmonic cancellation is mathematically ideal for a phase shift of exactly 45 degrees, if the two transmit paths are ideally matched. In reality, however, perfect cancellation may not be achievable because the two transmit paths will always have some mismatch and indeed the 45 degree phase rotation may have some error too, with FIG. 9 showing the sensitivity of the achievable cancellation to errors in the phase rotation. Although the best cancellation is achieved for an ideal 45 degree phase shift, it has been found that with +/−1 degree errors, the system still achieves very good cancellation (within a few dB of the optimum). Even with phase shift errors of +/−5 degrees it has been found that the system provides good, meaningful cancellation of around 20 dB for CIM3, CIM5 and 3rd harmonic. Thus, examples of the invention, and thus the claims, are targeted for any system where the phase shift is substantially 45 degrees +/−5 degrees, to allow for component tolerances, matched path differences and associated error.

Figure 10:
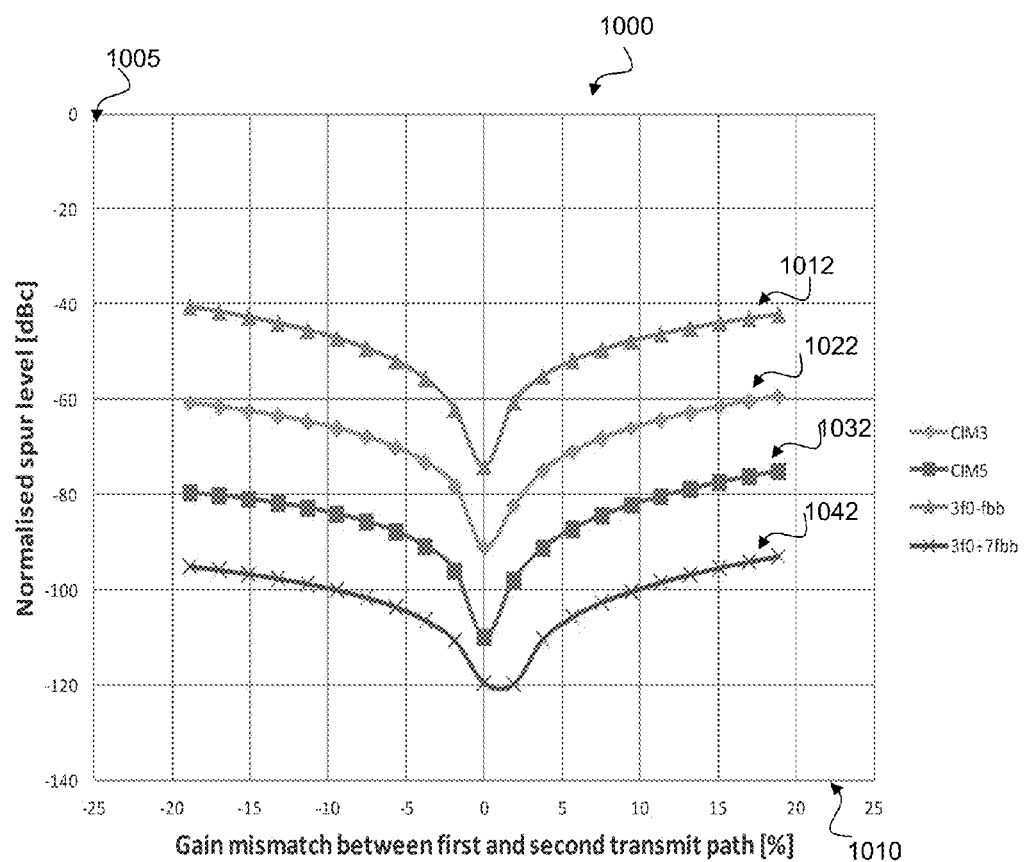
FIG. 10 illustrates a graphical example of a simulation of amplitude sensitivity highlighting the attenuation applied to respective multiple harmonics or spurs, according to example embodiments of the invention.

FIG. 10 illustrates a graphical example 1000 of a simulation of amplitude sensitivity highlighting the attenuation achieved for respective multiple harmonics or spurs, according to example embodiments of the invention. The relative normalised spur level on the Y-axis 1005, of the same four spurs 1012, 1022, 1032, 1042 as in FIG. 9, is shown. In this case, the X-axis 1010 is the gain mismatch between the first transmitter path and the second transmitter path. FIG. 10 clearly shows that good cancellation is achieved when the gain of the first and second transmit paths are essentially matched. Furthermore, FIG. 10 highlights that good spur rejection can be achieved without very high gain accuracy, and even with a large +/−2 dB gain mismatch between the first and second transmitter path the cancellation is degraded by only 10-15 dB.

Figure 11:
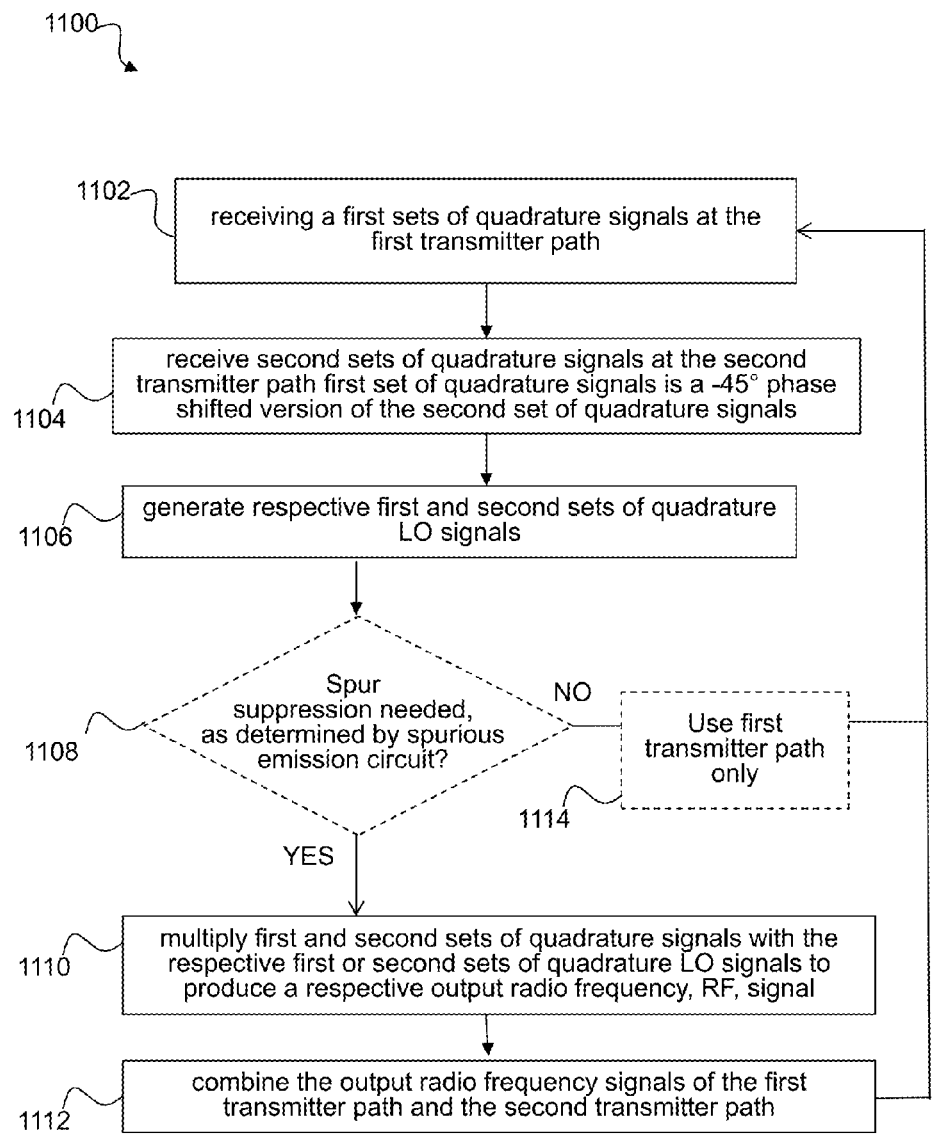
FIG. 11 illustrates an example flowchart to cancel or reject multiple harmonics or spurs, according to example embodiments of the invention.

Referring now to FIG. 11, an example flowchart 1100 illustrates a method to suppress, cancel or reject multiple harmonics or spurs, according to example embodiments of the invention. The flowchart 1100 is described for a transmitter that comprises a first transmitter path and a second transmitter path that are matched. The method comprises: receiving a first sets of quadrature signals at the first transmitter path at 1102; and receiving a second sets of quadrature signals at the second transmitter path at 1104. The first set of quadrature signals is a ±45° phase shifted version of the second set of quadrature signals; and the first set of quadrature LO signals is a reverse ±45° phase shifted version of the second set of quadrature LO signals. The flowchart then includes generating respective first and second sets of quadrature LO signals at 1106. In some optional examples, such as that described in FIG. 8, a determination as to whether spur suppression may be needed may be made at 1108, for example as determined by a spurious emission circuit.

If the determination at 1108 is that no spur suppression may be needed, a controller may decide to not turn off the second transmitter path, but re-configure the second transmitter path to use the same baseband and LO phases as the first transmitter path. However, if the determination at 1108 is that spur suppression may be needed, the method further comprises multiplying the first and second sets of quadrature signals with the respective first or second sets of quadrature LO signals to produce a respective output radio frequency, RF, signal at 1110. Thereafter, the multiple outputs of the first transmitter path and the second transmitter path are combined to produce an output radio frequency signal at 1112.

It is envisaged that the aforementioned inventive concept can be applied by a semiconductor manufacturer to any radio frequency transmitter module comprising baseband and/or radio frequency components or circuits that supports quadrature signals. It is further envisaged that, for example, a semiconductor manufacturer may employ the inventive concept in a design of a stand-alone radio frequency transmitter module or application-specific integrated circuit (ASIC) or may implement the concepts herein described in any other sub-system element.

However, it will be appreciated by a skilled artisan that the inventive concept herein described may be embodied in any type of wireless communication unit, such as those used in mobile phone communications, radar applications and/or military, civil and land mobile radio applications, to name but a few potential applications. In some examples, die may be constructed using one or more of the following technologies: complementary metal-oxide semiconductor (CMOS), BiCMOS (where BiCMOS is an evolved semiconductor technology that integrates two formerly separate semiconductor technologies, those of the bipolar junction transistor and the CMOS transistor, in a single integrated circuit device) or gallium arsenide (GaAs).

It will be appreciated that any suitable distribution of functionality between different functional units, for example with respect to the integrated circuits, may be used without detracting from the invention. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved transmitter and method for reducing or cancelling harmonic spurs, including CIM products has been described, wherein the aforementioned disadvantages with prior art arrangements have been substantially alleviated.

We claim:

1. A quadrature transmitter comprising:
   a first transmitter path and a second transmitter path that are matched and wherein each transmitter path comprises:
      at least one input arranged to receive respective first or second sets of quadrature baseband signals;
      at least one local oscillator (LO) port configured to receive respective first and second sets of quadrature LO signals;
      at least one mixer stage coupled to the at least one input and configured to respectively multiply the sets of quadrature baseband signals with the respective first or second sets of quadrature LO signals to produce a respective output radio frequency (RF) signal; and
   a combiner configured to combine the output radio frequency signals of the first transmitter path and the second transmitter path;
   wherein:
      the first set of quadrature baseband signals is a substantially 45° phase shifted version of the second set of quadrature baseband signals; and
      the first set of quadrature LO signals is a reverse substantially 45° phase shifted version of the second set of quadrature LO signals;
   wherein the quadrature transmitter further comprises a controller coupled to first pairs of switches coupled to the baseband input of the second transmit path and second pairs of switches located on the LO path of the second transmitter path and configured to selectively reconfigure the second transmitter path to operate on the same set of LO and baseband signals as the first transmitter path.

2. The quadrature transmitter of claim 1 wherein at least two sets of undesired radio frequency signals are anti-phase such that they are cancelled in the combiner.

3. The quadrature transmitter of claim 1 wherein a single set of quadrature baseband signals is applied to both the first transmitter path and the second transmitter path and wherein only one of the first and second transmitter paths comprises at least one baseband phase shifter coupled to the quadrature input and configured to provide a phase shifted by substantially ±45° representation of the quadrature input signal applied to the other transmitter path to its respective baseband input.

4. The quadrature transmitter of claim 3 wherein the baseband phase shift is performed in a digital domain and the first and second transmitter path each comprise a set of digital to analog converters (DACs) configured to generate analog quadrature signals.

5. The quadrature transmitter of claim 3 wherein the baseband phase shift is performed by analog phase rotation and where the single set of quadrature baseband signals is converted by a set of digital to analog converters, DACs, configured to generate analog quadrature signals.

6. The quadrature transmitter of claim 5 further comprising at least one error correction circuit operably coupled to an input of the set of DACs configured to apply one or more corrections to the set of quadrature digital signals shared between the first and second transmitter paths.

7. The quadrature transmitter of claim 1 wherein each of the first transmitter path and second transmitter path is implemented as a plurality of sliced transmitter paths wherein the combiner is a power combiner located external to the first plurality of sliced RF modules and second plurality of sliced RF modules.

8. The quadrature transmitter of claim 7 wherein each of the first plurality of sliced RF modules and second plurality of sliced RF modules comprises a second combiner configured to combine RF quadrature signals output by respective sliced RF modules.

9. The quadrature transmitter of claim 1 further comprising at least two sets of matched radio frequency, RF, amplifiers, each set of matched RF amplifiers being connected to a respective first transmitter path or second transmitter path.

10. The quadrature transmitter of claim 1 further comprising at least two sets of matched filters, each set of matched filters being connected to a respective set of quadrature input signals.

11. A quadrature transmitter comprising:
   a first transmitter path and a second transmitter path that are matched and wherein each transmitter path comprises:
      at least one input arranged to receive a single set of quadrature baseband signals;
      at least one local oscillator, LO, port configured to receive respective first and second sets of quadrature LO signals;
      at least one mixer stage coupled to the at least one input and configured to respectively multiply the sets of quadrature baseband signals with the respective first or second sets of quadrature LO signals to produce a respective output radio frequency, RF, signal; and
   a combiner configured to combine the output radio frequency signals of the first transmitter path and the second transmitter path;
   wherein:
      the first set of quadrature baseband signals is a substantially 45° phase shifted version of the second set of quadrature baseband signals; and
      the first set of quadrature LO signals is a reverse substantially 45° phase shifted version of the second set of quadrature LO signals;
   wherein only one of the first or second transmitter paths comprises at least one baseband phase shifter coupled to the quadrature input and configured to provide a phase shifted by substantially +45° representation of the quadrature input signal applied to the other transmitter path to its respective baseband input;
   the quadrature transmitter further comprising three error correction circuits operably coupled to an input of a set of digital to analog converters (DACs) configured to correct non-idealities in the set of quadrature analog signals between the first and second transmitter paths wherein two error correction circuits are configured to correct non-idealities within a respective first and second transmitter path and a third error correction circuit is configured to correct non-idealities on both the first and second transmitter paths.

12. The quadrature transmitter of claim 11 wherein each of the first transmitter path and second transmitter path comprises at least one error correction circuit operably coupled to the input of the set of DACs wherein the at least two error correction circuits are configured to correct non-idealities on a respective first transmitter path or second transmitter path separately in a digital domain before or after a phase rotation of a set of quadrature analog signals in the digital domain.

13. A quadrature transmitter comprising:
a first transmitter path and a second transmitter path that are matched and wherein each transmitter path comprises:
   at least one input arranged to receive respective first or second sets of quadrature baseband signals;
   at least one local oscillator, LO, port configured to receive respective first and second sets of quadrature LO signals;
   at least one mixer stage coupled to the at least one input and configured to respectively multiply the sets of quadrature baseband signals with the respective first or second sets of quadrature LO signals to produce a respective output radio frequency, RF, signal; and
a combiner configured to combine the output radio frequency signals of the first transmitter path and the second transmitter path;
wherein:
   the first set of quadrature baseband signals is a substantially 45° phase shifted version of the second set of quadrature baseband signals; and
   the first set of quadrature LO signals is a reverse substantially 45° phase shifted version of the second set of quadrature LO signals;
wherein each of the first transmitter path and second transmitter path is implemented as a plurality of sliced transmitter paths wherein the combiner is a power combiner located external to the first plurality of sliced radio frequency, RF, modules and second plurality of sliced RF modules and wherein each of the first plurality of sliced RF modules and second plurality of sliced RF modules comprises a second combiner configured to combine RF quadrature signals output by respective sliced RF modules; the quadrature transmitter further comprising a controller coupled to:
   a first pair of switches coupled to the baseband input of the second transmit path to provide the first set of quadrature baseband signals to each sliced RF module of the second transmitter path; and
   second pairs of switches located on the LO path of each respective sliced RF module of the second transmitter path and configured to selectively apply the reverse phase shifts to mixer stages on each sliced RF module of the second transmitter path.

14. A communication unit comprising a quadrature transmitter that comprises:
a first transmitter path and a second transmitter path that are matched and wherein each transmitter path comprises:
   at least one input arranged to receive respective first or second sets of quadrature baseband signals;
   at least one local oscillator (LO) port configured to receive respective first and second sets of quadrature LO signals;
   at least one mixer stage coupled to the at least one input and configured to respectively multiply the sets of quadrature baseband signals with the respective first or second sets of quadrature LO signals to produce a respective output radio frequency (RF) signal; and
a combiner configured to combine the output radio frequency signals of the first transmitter path and the second transmitter path;
wherein:
   the first set of quadrature baseband signals is a substantially 45° phase shifted version of the second set of quadrature baseband signals; and
   the first set of quadrature LO signals is a reverse substantially 45° phase shifted version of the second set of quadrature LO signals;
wherein the quadrature transmitter further comprises a controller coupled to first pairs of switches coupled to the baseband input of the second transmit path and second pairs of switches located on the LO path of the second transmitter path and configured to selectively reconfigure the second transmitter path to operate on the same set of LO and baseband signals as the first transmitter path.

15. The communication unit of claim 14 wherein at least two sets of undesired radio frequency signals are anti-phase such that they are cancelled in the combiner.

16. The communication unit of claim 14 wherein a single set of quadrature baseband signals is applied to both the first transmitter path and the second transmitter path and wherein only one of the first and second transmitter paths comprises at least one baseband phase shifter coupled to the quadrature input and configured to provide a phase shifted by substantially ±45° representation of the quadrature input signal applied to the other transmitter path to its respective baseband input.

17. A method for a transmitter that comprises a first transmitter path and a second transmitter path that are matched, the method comprising:
   receiving first sets of quadrature baseband signals at the first transmitter path;
   receiving second sets of quadrature baseband signals at the second transmitter path;
   generating respective first and second sets of quadrature local oscillator (LO) signals;
   multiplying the first and second sets of quadrature baseband signals with the respective first or second sets of quadrature LO signals to produce a respective output radio frequency (RF) signal; and
   combining the output radio frequency signals of the first transmitter path and the second transmitter path;
wherein:
   the first set of quadrature baseband signals is a substantially 45° phase shifted version of the second set of quadrature baseband signals; and
   the first set of quadrature LO signals is a reverse substantially 45° phase shifted version of the second set of quadrature LO signals; and
   selectively reconfiguring the second transmitter path to operate on the same set of LO signals and baseband signals as the first transmitter path.

18. A communication unit comprising a quadrature transmitter that comprises:

a first transmitter path and a second transmitter path that are matched and wherein each transmitter path comprises:
  at least one input arranged to receive respective first or second sets of quadrature baseband signals;
  at least one local oscillator (LO) port configured to receive respective first and second sets of quadrature LO signals;
  at least one mixer stage coupled to the at least one input and configured to respectively multiply the sets of quadrature baseband signals with the respective first or second sets of quadrature LO signals to produce a respective output radio frequency (RF) signal; and
  a combiner configured to combine the output radio frequency signals of the first transmitter path and the second transmitter path;
  wherein:
    the first set of quadrature baseband signals is a substantially 45° phase shifted version of the second set of quadrature baseband signals; and
    the first set of quadrature LO signals is a reverse substantially 45° phase shifted version of the second set of quadrature LO signals;
  wherein each of the first transmitter path and second transmitter path is implemented as a plurality of sliced transmitter paths wherein the combiner is a power combiner located external to the first plurality of sliced radio frequency, RF, modules and second plurality of sliced RF modules and wherein each of the first plurality of sliced RF modules and second plurality of sliced RF modules comprises a second combiner configured to combine RF quadrature signals output by respective sliced RF modules; the quadrature transmitter further comprising a controller coupled to:
    a first pair of switches coupled to the baseband input of the second transmit path to provide the first set of quadrature baseband signals to each sliced RF module of the second transmitter path; and
    second pairs of switches located on the LO path of each respective sliced RF module of the second transmitter path and configured to selectively apply the reverse phase shifts to mixer stages on each sliced RF module of the second transmitter path.

19. A communication unit comprising a quadrature transmitter that comprises:
  a first transmitter path and a second transmitter path that are matched and wherein each transmitter path comprises:
    at least one input arranged to receive a single set of quadrature baseband signals;
    at least one local oscillator (LO) port configured to receive respective first and second sets of quadrature LO signals;
    at least one mixer stage coupled to the at least one input and configured to respectively multiply the sets of quadrature baseband signals with the respective first or second sets of quadrature LO signals to produce a respective output radio frequency (RF) signal; and
  a combiner configured to combine the output radio frequency signals of the first transmitter path and the second transmitter path;
  wherein:
    the first set of quadrature baseband signals is a substantially 45° phase shifted version of the second set of quadrature baseband signals; and
    the first set of quadrature LO signals is a reverse substantially 45° phase shifted version of the second set of quadrature LO signals;
  wherein only one of the first or second transmitter paths comprises at least one baseband phase shifter coupled to the quadrature input and configured to provide a phase shifted by substantially +45° representation of the quadrature input signal applied to the other transmitter path to its respective baseband input;
  the quadrature transmitter further comprising three error correction circuits operably coupled to an input of a set of digital to analog converters (DACs) configured to correct non-idealities in the set of quadrature analog signals between the first and second transmitter paths wherein two error correction circuits are configured to correct non-idealities within a respective first and second transmitter path and a third error correction circuit is configured to correct non-idealities on both the first and second transmitter paths.

20. A method for a quadrature transmitter, the method comprising:
  implementing a first transmitter path and second transmitter path that are matched as a plurality of sliced transmitter paths;
  receiving first sets of quadrature baseband signals at the first transmitter path;
  receiving second sets of quadrature baseband signals at the second transmitter path;
  generating respective first and second sets of quadrature local oscillator (LO) signals;
  multiplying the first and second sets of quadrature baseband signals with the respective first or second sets of quadrature LO signals to produce a respective output radio frequency, RF, signal; and
  power combining the output radio frequency signals of the first transmitter path and the second transmitter path, external to a first plurality of sliced RF modules and second plurality of sliced RF modules located on a respective one of the plurality of sliced transmitter paths;
  wherein:
    the first set of quadrature baseband signals is a substantially 45° phase shifted version of the second set of quadrature baseband signals; and
    the first set of quadrature LO signals is a reverse substantially 45° phase shifted version of the second set of quadrature LO signals;
    wherein the power combining is performed by a power combiner and;
    the quadrature transmitter further comprising a controller coupled to:
      providing a first set of quadrature baseband signals to each sliced RF module of the second transmitter path via a first pair of switches coupled to the baseband input of the second transmit path; and
      selectively applying the reverse phase shifts to mixer stages on each sliced RF module of the second transmitter path via second pairs of switches located on a LO path of each respective sliced RF module of the second transmitter path.

21. A method for a transmitter that comprises a first transmitter path and a second transmitter path that are matched, the method comprising:
  receiving first sets of quadrature baseband signals at the first transmitter path;
  receiving second sets of quadrature baseband signals at the second transmitter path;

generating respective first and second sets of quadrature local oscillator (LO) signals;

multiplying the first and second sets of quadrature baseband signals with the respective first or second sets of quadrature LO signals to produce a respective output radio frequency (RF) signal; and combining the output radio frequency signals of the first transmitter path and the second transmitter path;

wherein:

the first set of quadrature baseband signals is a substantially 45° phase shifted version of the second set of quadrature baseband signals; and the first set of quadrature LO signals is a reverse substantially 45° phase shifted version of the second set of quadrature LO signals;

wherein only one of the first and second transmitter paths comprises at least one baseband phase shifter coupled to the quadrature input and configured to provide a phase shifted by substantially +45° representation of the quadrature input signal applied to the other transmitter path to its respective baseband input;

the method further comprising:

correcting non-idealities within a respective first and second transmitter path by two error correction circuits; and correcting non-idealities on both the first and second transmitter paths by a third error correction circuit.

* * * * *